United States Patent
Han et al.

(10) Patent No.: US 9,892,291 B2
(45) Date of Patent: Feb. 13, 2018

(54) RADIO FREQUENCY IDENTIFICATION (RFID) READER, RFID TAG, AND METHOD THEREOF FOR PERFORMING WRITE CHECK OF TAG DATA

(71) Applicant: ELECTRONICS AND TELECOMMUNICATIONS RESEARCH INSTITUTE, Daejeon-si (KR)

(72) Inventors: Kyu Won Han, Daejeon-si (KR); Chan Won Park, Daejeon-si (KR); Dong Beom Shin, Daejeon-si (KR); Sang Hyun Mo, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 0 days.

(21) Appl. No.: 15/081,051

(22) Filed: Mar. 25, 2016

(65) Prior Publication Data

US 2016/0283755 A1 Sep. 29, 2016

(30) Foreign Application Priority Data

Mar. 27, 2015 (KR) ........................ 10-2015-0043413

(51) Int. Cl.
*G06K 7/10* (2006.01)
*G06K 19/07* (2006.01)

(52) U.S. Cl.
CPC ..... *G06K 7/10009* (2013.01); *G06K 19/0722* (2013.01)

(58) Field of Classification Search
CPC ........... G06K 7/10009; G06K 19/0722; G06K 19/0723
USPC .............................. 340/10.5, 10.51
See application file for complete search history.

(56) References Cited

U.S. PATENT DOCUMENTS

| 4,955,038 | A | * | 9/1990 | Lee ..................... H04W 52/029 340/10.33 |
| 5,430,447 | A | * | 7/1995 | Meier ................. G06K 19/0723 340/10.34 |
| 5,517,194 | A | * | 5/1996 | Carroll .................. G01S 13/325 340/10.34 |
| 5,532,686 | A | * | 7/1996 | Urbas ................. G07C 9/00111 340/10.51 |
| 8,164,424 | B2 | | 4/2012 | Hong et al. |
| 8,274,374 | B2 | | 9/2012 | Kim et al. |

(Continued)

FOREIGN PATENT DOCUMENTS

JP 2012-234243 A 11/2012
KR 10-0961254 B1 6/2010

(Continued)

*Primary Examiner* — Edwin Holloway, III
(74) *Attorney, Agent, or Firm* — Rabin & Berdo, P.C.

(57) ABSTRACT

An RFID reader, RFID tag, and method thereof for performing a write check of tag data. According to an exemplary embodiment, the RFID reader may include: a transmitter to transmit a write check command to an RFID tag; a receiver to receive a response including a check value of data, which needs a write check, from an RFID tag that has received the write check command; and a controller to perform information transmission and reception processes, and check data written on the RFID tag by using the received response.

17 Claims, 7 Drawing Sheets

(56) References Cited

U.S. PATENT DOCUMENTS

| | | | |
|---|---|---|---|
| 9,004,367 B2 | 4/2015 | Lee et al. | |
| 2006/0179391 A1* | 8/2006 | Rodriguez | H04L 1/188 714/749 |
| 2008/0041930 A1* | 2/2008 | Smith | G06F 9/44505 235/375 |
| 2008/0129447 A1 | 6/2008 | Choi et al. | |
| 2008/0136599 A1* | 6/2008 | Sugano | G06K 7/0008 340/10.1 |
| 2009/0045919 A1* | 2/2009 | Fukui | H01Q 7/00 340/10.1 |
| 2009/0129595 A1* | 5/2009 | Stam | G06F 21/31 380/277 |
| 2013/0234837 A1* | 9/2013 | Li | G06K 7/10009 340/10.51 |

FOREIGN PATENT DOCUMENTS

| | | |
|---|---|---|
| KR | 10-2013-0054294 A | 5/2013 |
| KR | 10-2014-0063138 A | 5/2014 |

\* cited by examiner

FIG. 2

| COMMAND | MEMBANK | WORDPTR | WORD COUNT | PACKET CRC |
|---------|---------|---------|------------|------------|
| 200 | 210 | 220 | 230 | 240 |

| DATA ADDRESS | DATA |
|---|---|
|  |  |
|  |  |
|  |  |
|  |  |
|  |  |
|  |  |
|  |  |
|  |  |

RADIO FREQUENCY IDENTIFICATION (RFID) READER, RFID TAG, AND METHOD THEREOF FOR PERFORMING WRITE CHECK OF TAG DATA

CROSS-REFERENCE TO RELATED APPLICATION(S)

This application claims the benefit under 35 U.S.C. § 119(a) of Korean Patent Application No. 10-2015-0043413, filed on Mar. 27, 2015, in the Korean Intellectual Property Office, the entire disclosure of which is incorporated herein by reference for all purposes.

BACKGROUND

1. Field

The following description relates to a radio frequency identification (RFID) technology, and more specifically, to a technology for checking data of tag memory.

2. Description of the Related Art

Due to the development of technology, various technologies have been applied to radio frequency identification (hereinafter referred to as 'RFID') systems, thus allowing for data of more extended sizes to be written onto RFIC tags. At this time, a time delay may occur in checking the tag data written on the RFID tag, and so as the size of data gets bigger, reduction in a processing speed becomes important.

As a method of checking RFID tag data, there is one in which an RFID reader requests data to an RFID tag, receives the data directly from the RFID tag, and checks the received data. However, there are drawbacks to the above-mentioned method in that if the data that needs to be checked is big, it may take a long time to receive a response from the RFID tag, or multiple request/response attempts to and from the RFID tag before may need to take place. Thus, delays in checking the data occur according to the size of data.

Another method of checking the RFID tag data is one whereby if the RFID reader transmits data to be checked to RFID tags by using a tag group selection command, only the RFID tags meeting the condition respond to the next command so as to check the data of the RFID tag. But said method also has delays in checking data according to the size of data.

SUMMARY

The following description relates to an RFID reader, RFID tag, and method thereof for performing a write check of tag data so as to support a fast write check without any delays.

In one general aspect, a radio frequency identification (RFID) reader includes: a transmitter to transmit a write check command to an RFID tag; a receiver to receive a response including a check value of data, which needs a write check, from an RFID tag that has received the write check command; and a controller to control the transmitter and the receiver, and check data written on the RFID tag by using the received response.

The write check command may include tag memory parameters to access the tag memory, which stores the data that needs the write check, wherein the tag memory parameters comprise a data storage address and a data length of the data that needs the write check. The data check value may be a cyclic redundancy check (CRC) value of the data stored in the tag memory of the RFID tag.

The controller may compare the data check value received from the RFID tag to a data check value that the RFID reader has, so as to check whether the data has been written on the RFID tag.

In response to the received data check value being different from the data check value that the RFID reader has, the controller may re-perform an operation of writing the data on the RFID tag.

In response to the RFID tag being in an access state, the controller may transmit the write check command to the RFID tag through the transmitter.

In response to failure to receive a response to a write command from the RFID tag, the controller may transmit the write check command through the transmitter. Here, in response to failure to receive the response to the write command within a duration of a preset threshold value, the controller may transmit the write check command through the transmitter, wherein the preset threshold value is shorter than or the same as a duration of time taken to receive the response to the write command.

In another general aspect, an RFID tag includes: a receiver to receive a message of a write check command from an RFID reader; a transmitter to transmit a response to the received write check command to the RFID reader; a tag memory to store data; and a controller to control the transmitter and the receiver, examine data that needs a write check on the tag memory in response to the write check command, and transmit a response including a data check value through the transmitter.

The write check command may include tag memory parameters to access the tag memory, which stores data that needs the write check, wherein the tag memory parameter comprises a data storage address and a data length of the data that needs the write check.

The controller may search for the data of the tag memory, which has the tag memory parameter included in the write check, and examine the searched data.

The controller may extract a CRC value of the data that needs the write check, and transmit a response, which includes the extracted CRC value, to the RFID reader through the transmitter.

The controller may change a tag state; and in response to an access state, receive the write check command from the RFID reader through the transmitter, and perform a process of the received write check command.

In another general aspect, a method of checking a write check of tag data includes: transmitting, by an RFID reader, a write check command to an RFID tag; receiving a response including a check value of data, which needs a write check, from the RFID tag that has received the write check command; and checking whether data is written on the RFID tag by using the received response.

The write check command may include tag memory parameters to access the tag memory, which stores the data that needs the write check, wherein the tag memory parameter comprises a data storage address and a data length of the data that needs the write check. The data check value may be a cyclic redundancy check (CRC) value of the data stored in the tag memory of the RFID tag.

The method may further include: identifying the RFID tag before transmitting the write check command; and transmitting the write command to the identified RFID tag, wherein the write check command is transmitted to the RFID tag when the response to the write command is not received within a duration of a preset threshold value. The duration of a preset threshold value may be shorter than or the same as a reception duration of the response to the write command.

The checking of whether the data has been written on the RFID tag may include comparing the data check value received from the RFID tag to a data check value that the RFID reader has, so as to check whether the data has been written on the RFID tag.

The method may further include, in response to a determination that the data write has not been performed on the RFID tag after checking whether the data has been written on the RFID tag, transmitting, to the RFID tag, a command for writing the data.

Other features and aspects may be apparent from the following detailed description, the drawings, and the claims.

BRIEF DESCRIPTION OF THE DRAWINGS

FIG. 2 is a diagram illustrating an example of a structure of a write check command (WRITE_CHECK).

FIG. 4 is a diagram illustrating an example of a table structure of tag memory.

Figure 1:
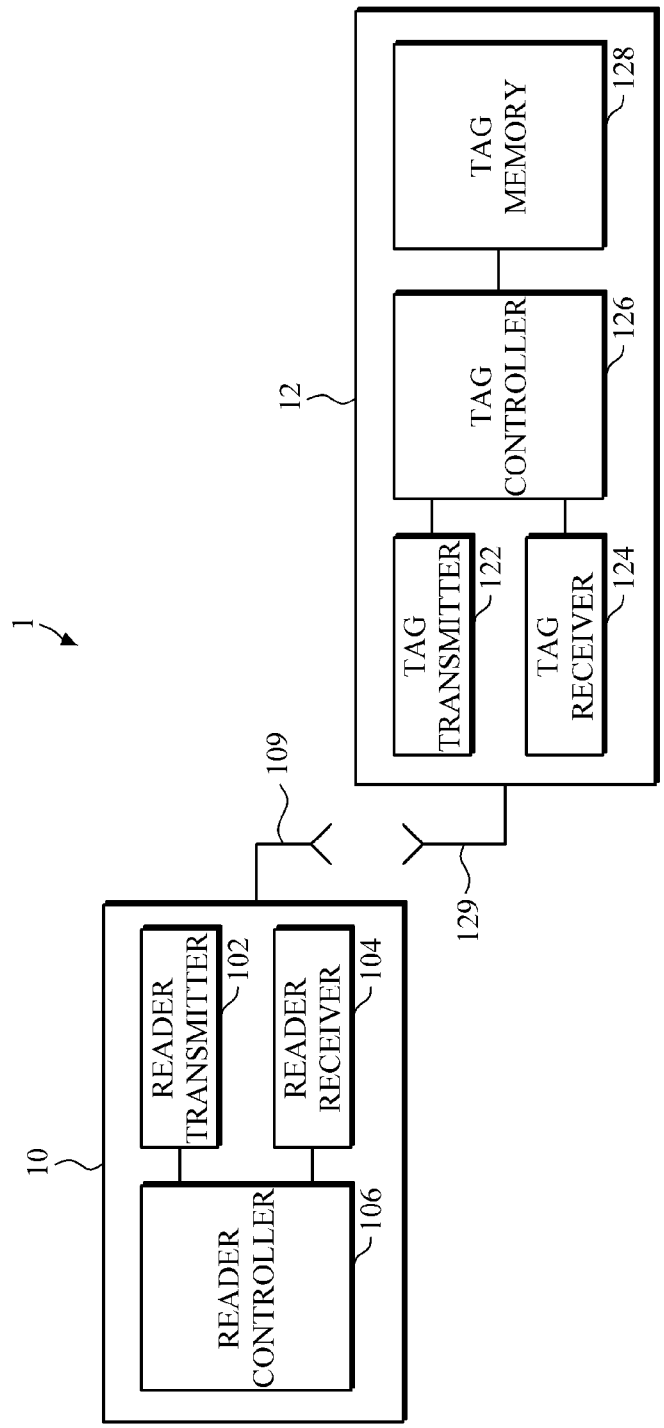
FIG. 1 is a diagram illustrating a radio frequency identification (RFID) system according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a radio frequency identification (RFID) system according to an exemplary embodiment.

Referring to FIG. 1, an RFID system 1 includes an RFID reader 10 and an RFID tag 12. However, an RFID system may be comprised of a plurality of RFID tags 12.

The RFID reader 10 and the RFID tag 12 communicate with each other over a wireless communications channel.

The RFID reader 10 is an interrogator, which transmits an interrogation to the RFID tag 12 and receives a response that corresponds to the interrogation information from the RFID tag 12. The RFID reader 10 performs a writing operation—the task of writing data on the RFID tag 12, as well as a reading operation—the task of reading the data written on the RFID tag 12. After a writing operation on the RFID tag 12 has been carried out, the RFID reader 10 checks whether the data has been successfully written on the RFID tag 12.

The RFID reader 10 includes a reader transmitter 102, a reader receiver 104, a reader controller 106, and a reader antenna 109.

The reader transmitter 102 transmits a write check command (WRITE_CHECK) to the RFID tag 12 through the antenna 109. The write check command consists of tag memory parameters for accessing the tag memory 128 storing the data, which needs the write check, whereby the tag memory parameters include a data storage address for the correlating data in need of the write check and a data length thereof. The structure of the write check command will be described later with reference to FIG. 2.

Through the reader antenna 109, the reader receiver 104 receives a command of a write check response (WRITE_CHECK_RESPONSE) from the RFID tag 12, which has received the write check command (WRITE_CHECK). The response includes a check value of the data that needs the write check (i.e. a data check value). For example, the data check value may be a cyclic redundancy check (hereinafter referred to as 'CRC') value. The structure of the tag response will be described later with reference to FIG. 3.

The reader controller 106 is in charge of central processing of the RFID reader 10, which specifically controls the transmission and reception operations of the reader transmitter 102 and the reader receiver 104 in order to process data writing onto the RFID tag 12, reading the data on the RFID tag 12, checking the data written on the RFID tag 12, and the like.

The reader controller 106 checks whether the data has been successfully written on the RFID tag 12 by using the response that has been received from the RFID tag 12 through the reader receiver 104. The reader controller 106 compares the data check value, received from the RFID tag 12, to a data check value that is included in the RFID reader 10 itself, so as to check whether the operation of data writing has been successfully performed. If, at this time, the data check value received from the RFID tag 12 is different from the data check value that is included in the reader controller 106, then the reader controller 106 may re-perform the data writing operation.

The reader controller 106 may transmit a write command (WRITE) to the RFID tag 12 for which the reader controller 106 is to receive a response therefrom. However, if it does not receive a response to the write command, the reader controller 106 transmits a write check command via the reader transmitter 102 to the RFID tag 12. Here, the reader controller 106 presets a threshold value, a duration in which said controller should receive a response to the write command, but if a response to the write check has not been received from the RFID tag 12, the reader controller 106 may transmit said write check command to the RFID tag 12 through the reader transmitter 102. The duration of preset threshold value may be shorter than or the same as the duration of time it takes to receive a response to the write command which will be described later with reference to FIG. 7.

The RFID tag 12 includes a tag transmitter 122, a tag receiver 124, a tag controller 126, a tag memory 128, and a tag antenna 129.

The tag receiver 124 receives the message of the write check command from the RFID reader 10 through the tag antenna 129. The tag transmitter 122 transmits a response to the write check command received from the RFID reader 10 to the RFID reader 10 through the tag antenna 129. The write check command consists of tag memory parameters, which may include a data storage address for the correlating data in need of the write check, and a data length thereof.

The tag memory 128 stores data, as well as the data for each data address. A storage table of the tag memory 128 will be described later with reference to FIG. 4.

The tag controller 126 performs information transmission and reception processes by using the tag transmitter 122 and the tag receiver 124, and controls a tag state. In response to the write check command received from the RFID reader 10, the tag controller 126 examines the pertinent data_in the tag memory 128 through the tag receiver 124. Then, the tag controller 126 transmits a response, including the data check value, to the RFID reader 10 through the tag transmitter 122.

The tag controller 126 searches, in the tag memory 128, for the data that has tag memory parameters included in the write check command, and examines the searched data. Here, the tag controller 126 extracts a CRC with respect to the relevant data, and transmits a response, including the extracted CRC, to the RFID reader 10 through the tag transmitter 22.

In the exemplary embodiment, the tag controller 126 controls the state which a tag is in, whereby if the state of the tag were to be changed into an access state—a state in which the RFID reader 10 is allowed to access the RFID tag 12—the tag controller 126 may then receive the write check command through the tag receiver 124 and process it.

FIG. 2 is a diagram illustrating an example of a structure of a write check command (WRITE_CHECK).

Referring to FIG. 2, an RFID reader transmits a write check command (WRITE_CHECK) 20 to an RFID tag. In the write check command 20, COMMAND 200 refers to a command code. MEMBANK 210 refers to a bank of the tag memory that should be checked. WORDPTR 220 refers to the word address, at which the data to be checked should start, of said tag memory. WORD COUNT 230 refers to a data length of said tag memory. Also, PCKET CRC 240 refers to a CRC of a transmitted packet. A method of calculating the CRC is not limited to any one in particular.

Figure 3:
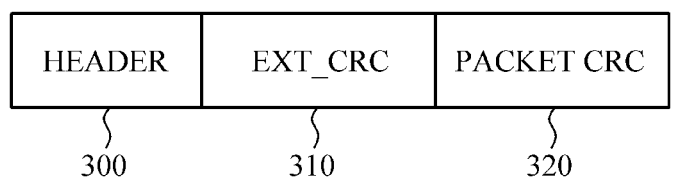
FIG. 3 is a diagram illustrating an example of a structure of a write check response (WRITE_CHECK_RESPONSE) message.

FIG. 3 is a diagram illustrating an example of a structure of a write check response (WRITE_CHECK_RESPONSE) message.

Referring to FIG. 3, when receiving a write check command from an RFID reader, an RFID tag extracts, based on memory parameters, a CRC value with respect to data of the relevant tag memory, and transmits a write check response (WRITE_CHECK_RESPONSE) 30.

In the write check response 30, HEADER 300 refers to a header value of a tag response. EXT_CRC 310 refers to the CRC that is calculated with respect to data of the tag memory corresponding to tag memory parameters included in a write check command (WRITE_CHECK). A method of calculating the CRC is not limited to any one in particular. Hence, PACKET CRC 320, which refers to the CRC of a transmitted packet, is not limited to a particular method of calculation.

Figure 4:
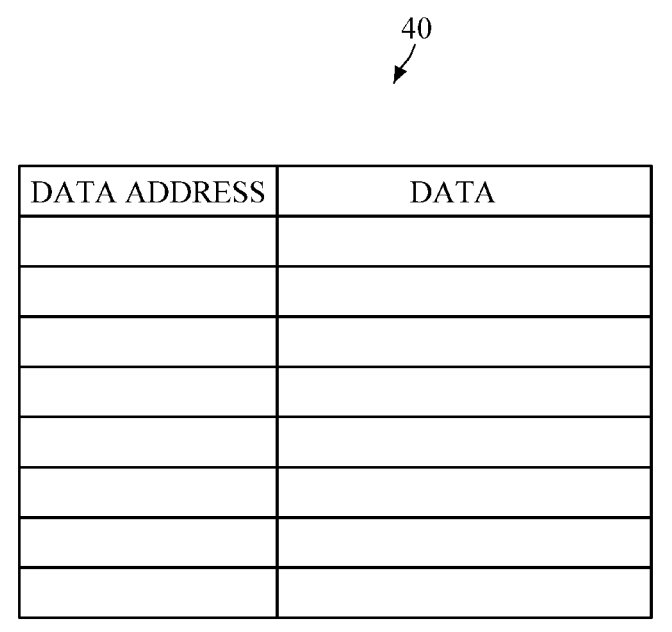

FIG. 4 is a diagram illustrating an example of a table structure of tag memory.

A table 40 of tag memory consists of a data address, as well as data that correspond to the data address. When a write check command from an RFID reader has been received, an RFID tag performs, based on memory parameters included in the write check command, a search in a tag memory table 40 for data that needs the write check; extracts a CRC value; and transmits a write check response that includes the extracted CRC value to the RFID reader.

Figure 5:
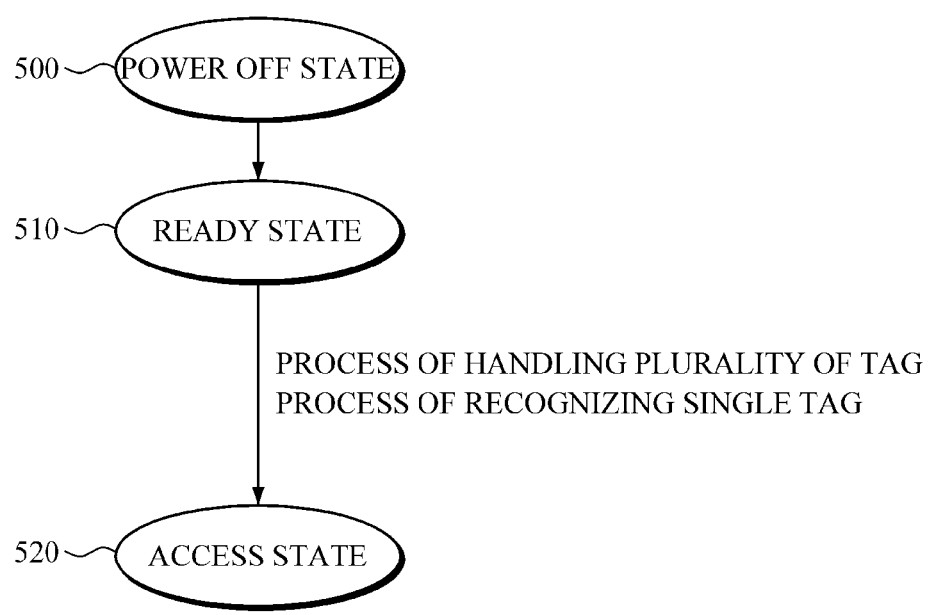
FIG. 5 is a diagram illustrating an example of a state transition of an RFID tag.

FIG. 5 is a diagram illustrating an example of a state transition of an RFID tag.

Referring to FIG. 5, a state of an RFID tag is changed to a 'ready state' 510 by providing is a certain amount of power to said tag while it is in a 'power-off state' 500. From the ready state 510, the RFID tag is changed to an 'access state' 520 through a tag recognition process of an RFID reader. The tag recognition process may involve a process of recognizing a single tag and may also include a process of handling a plurality of tags. The process of handling a plurality of tags involves selecting a single tag from the plurality of the tags. The process of recognizing a single tag involves the RFID reader recognizing said selected single tag.

Through the single tag recognition process, an RFID tag that is accessible by the RFID reader on a 1:1 is changed to an access state 520.

The RFID tag in the access state 520 may receive, from the RFID reader, a command to access tag memory, and process the command. The RFID tag in the access state 520 receives a write check command from the RFID reader, and performs an operation corresponding to the command.

Figure 6:
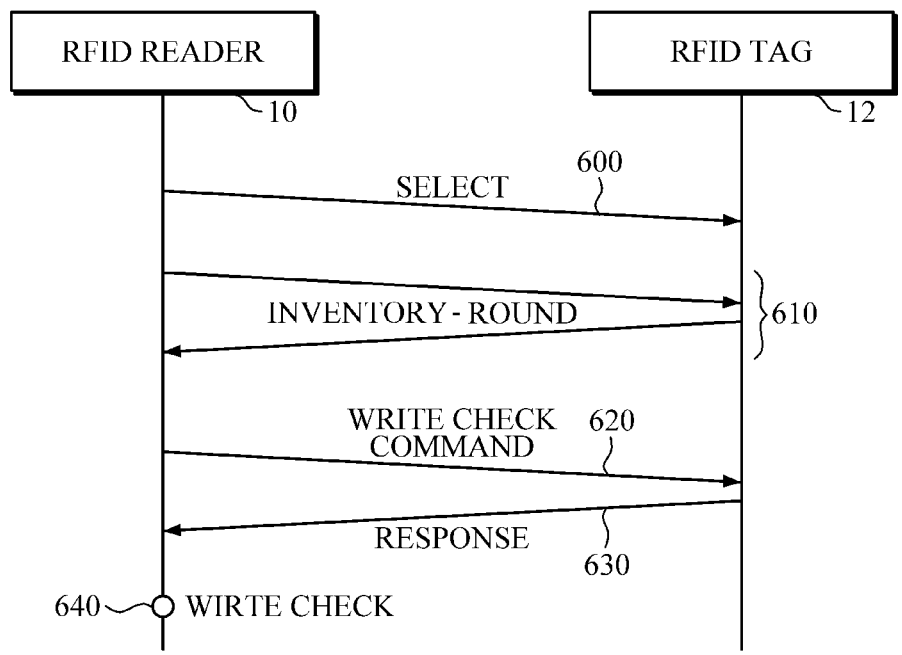
FIG. 6 is a flowchart illustrating a process for performing a write check of tag data.

FIG. 6 is a flowchart illustrating a process for performing a write check of tag data.

An RFID reader 10 selects a tag group through a command of SELECT 600, so as to give a command to a particular RFID tag 12. The selection operation 600 is not necessary.

Subsequently, the RFID reader 10 identifies one tag among a plurality of tags in operation 610 of an inventory round, which includes a process of handling a plurality of tags and a process of handling a single tag.

Subsequently, the RFID reader 10 transmits a write check command 620 to the RFID tag 12 so as to check the written data. Here, the RFID tag 12 is in an access state. The write check command 620 has tag memory parameters, which includes a tag memory bank, a word address, a data length, etc.

In response to the write check command, the RFID tag 12, which has received the write check command 620, examines data that needs the write check at tag memory. The RFID tag 12 transmits a response, including the data check value, to the RFID reader 10. Here, the RFID tag 12 may search for data of the tag memory, which has the tag memory parameters included in the write check command 620, and examine the searched data. The data check value may be a CRC, and the RFID tag 12 transmits the response 630, including the CRC, to the RFID reader 10.

Subsequently, the RFID reader 10 compares the received data check value to a data check value that the RFID reader itself has, so as to check whether the data has been written in 640. If the data check values are identical to each other, it is determined that the data has been successfully written on the RFID tag 12.

Figure 7:
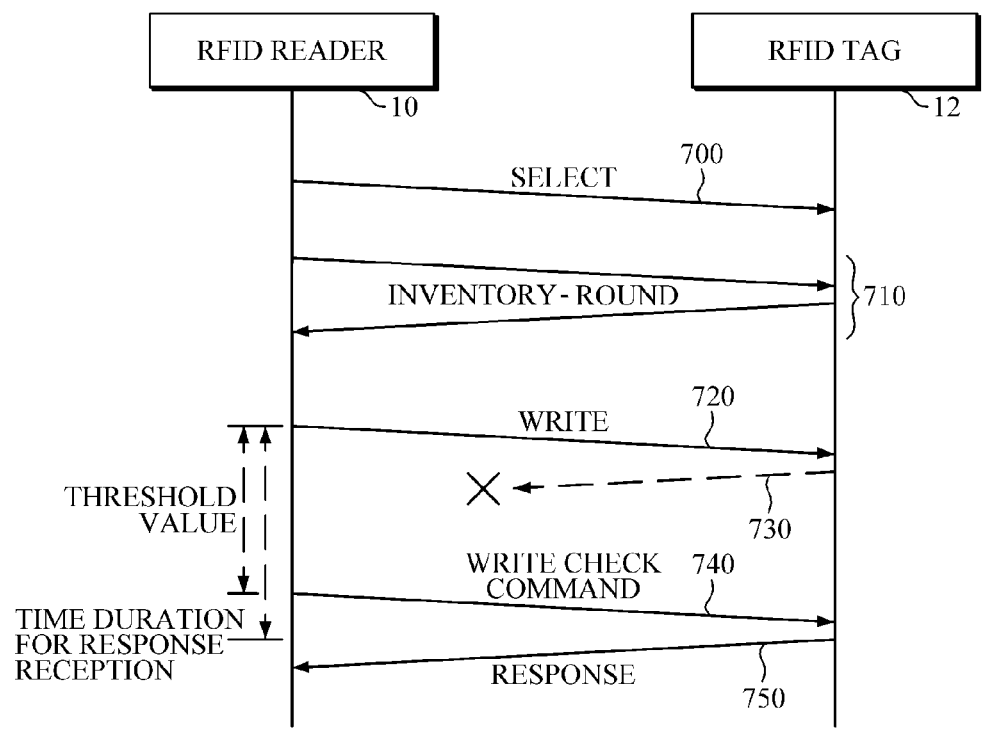
FIG. 7 is a flowchart illustrating an example of a process for, in a case of a failure in performing a write command, checking whether data has been successfully written on a tag.

FIG. 7 is a flowchart illustrating an example of a process for, in a case of a failure in performing a write command, checking whether data has been successfully written on a tag.

Referring to FIG. 7, an RFID reader 10 selects a tag group through the command, 'SELECT' 700, so as to give a command to a particular RFID tag 12. The selection operation 700 is not necessary. Subsequently, the RFID reader 10 identifies one tag among a plurality of tags in operation 710 of an inventory round, which includes a process of handling a plurality of tags and a process of handling a single tag.

Subsequently, the RFID reader 10 transmits a write command 720 to the RFID tag 12 in an access state. The write command 720 includes a data address, a data length, and data. After the transmission of the write command 720, the RFID reader 10 may receive a response of the success in writing data from the RFID tag 12 if the data has been successfully written. However, if the response to the write command within the duration of a threshold, set in advance by the RFID reader 10 or a user, has not been received in 730, the RFID reader 10 transmits a write check command 740 to the RFID tag 12. Here, the threshold may be set to be shorter than or the same as a general duration of the write response.

The write check command 740 includes information of a tag memory bank, where data that needs the write check is stored, a data address, and a data length. In response to the write check command 740, the RFID tag 12, which has received the write check command 740, examines data that needs the write check at the tag memory. Then, a response 750 including the data check value is transmitted to the RFID reader 10. Here, the RFID tag 12 searches for the data of the tag memory, which has tag memory parameters included in the write check command 740, and examines the searched data. The data check value may be a CRC, and the RFID tag 12 transmits the response 750, including the CRC, to the RFID reader 10.

Subsequently, the RFID reader 10 compares the received data check value to a data check value that the RFID reader itself has. The data check value may be a CRC. If the data check values are different from each other, the RFID reader 10 may re-transmit the write command to the RFID tag 12, and then re-perform the writing operation.

According to an exemplary embodiment, an RFID reader for performing a write check of tag data, an RFID tag thereof, and a method thereof support a fast write check without a delay to RFID tag data. Also, the RFID reader, tag, and the method thereof may quickly perform a data check of tag memory according to the purpose of use. Such an RFID tag having such a structure having the above-mentioned functions may be applied to various and expansive application services.

While using a method for requesting data to the RFID tag and receiving the data directly from the RFID tag to check the tag data, a delay for the data check is experienced, whereby said delay is relative to a size of the data. Such a delay is also experienced when the RFID reader transmits data to be checked to the RFID tags by using a tag group selection command and then controls the RFID tag that meets a certain condition so that it responds to the next command, thus enabling a data check of the RFID tag.

However, according to an exemplary embodiment of the present disclosure, the RFID reader transmits a write check command to the RFID tag; acquires, from the RFID tag, a check value of data in the tag memory that the RFID reader has designated; and checks the tag data by using the acquired check value. Such a method leads to a significant enhancement in processing speed as opposed to a method of receiving data from the RFID tag and comparing the received data to data that the RFID reader has.

In a case, where the RFID reader transmits data directly to the RFID tag, the RFID reader can receive a response from the RFID tag that the writing went successfully if indeed the writing was successfully written on said tag; but if the writing failed, the RFID reader needs to wait for a response from the RFID tag. However, according to an exemplary embodiment of the present disclosure, if there is no response from an RFID tag within a duration of a threshold value set in advance by an RFID reader or a user, the RFID reader transmits a write check command to the RFID tag so as to check the written data through the response thereto, thereby shortening the time for the write check. Also, after comparing a CRC value received from the RFID tag to a CRC value of the data, which the RFID reader has, the RFID reader can quickly retry the write check again if the CRC values are different from each other.

When attempting to write on a plurality of tags, a command is broadcasted. But this may lead to the RFID reader being unable to receive the response thereto from the RFID tag. Also, individual access to the tag data is required for each write check, and there would be a delay for each data check relative to the number of the RFID tags and size of data. However, according to an exemplary embodiment of the present disclosure, data of the tag memory can be quickly checked through a write check command and a process thereof for specific data of the tag memory, which needs the write check.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A radio frequency identification (RFID) reader, comprising:
   a transmitter configured to transmit a write check command to an RFID tag;
   a receiver configured to receive a response including a check value of data, which needs a write check, from an RFID tag that has received the write check command; and
   a controller configured to control the transmitter and the receiver, and check data written on the RFID tag by using the received response;
   wherein the controller is further configured to, in response to failure to receive a response to a write command from the RFID tag, transmit the write check command through the transmitter.

2. The RFID reader of claim 1, wherein the write check command comprises tag memory parameters to access the tag memory, which stores the data that needs the write check, wherein the tag memory parameters comprise a data storage address and a data length of the data that needs the write check.

3. The RFID reader of claim 1, wherein the data check value is a cyclic redundancy check (CRC) value of the data stored in the tag memory of the RFID tag.

4. The RFID reader of claim 1, wherein the controller is configured to compare the data check value received from the RFID tag to a data check value that the RFID reader has, so as to check whether the data has been written on the RFID tag.

5. The RFID reader of claim 4, wherein in response to the received data check value being different from the data check value that the RFID reader has, the controller is configured to re-perform an operation of writing the data on the RFID tag.

6. The RFID reader of claim 1, wherein in response to the RFID tag being in an access state, the controller is configured to transmit the write check command to the RFID tag through the transmitter.

7. The RFID reader of claim 1, wherein in response to failure to receive the response to the write command within a duration of a preset threshold value, the controller is configured to transmit the write check command through the transmitter, wherein the preset threshold value is shorter than or the same as a duration of time taken to receive the response to the write command.

8. An RFID tag, comprising:
   a receiver configured to receive a message of a write check command from an RFID reader;
   a transmitter configured to transmit a response to the received write check command to the RFID reader;
   a tag memory configured to store data; and
   a controller configured to control the transmitter and the receiver, examine data that needs a write check on the tag memory in response to the write check command, and transmit a response including a data check value through the transmitter;
   wherein the controller is further configured to change a tag state; and in response to an access state and in response to failure by the RFID reader to receive a response to a write command from the RFID tag, receive the write check command from the RFID reader through the transmitter, and perform a process of the received write check command.

9. The RFID tag of claim 8, wherein the write check command comprises tag memory parameters to access the tag memory, which stores data that needs the write check, wherein the tag memory parameter comprises a data storage address and a data length of the data that needs the write check.

10. The RFID tag of claim 9, wherein the controller is configured to search for the data of the tag memory, which has the tag memory parameter included in the write check, and examine the searched data.

11. The RFID tag of claim 8, wherein the controller is configured to extract a CRC value of the data that needs the write check, and transmit a response, which includes the extracted CRC value, to the RFID reader through the transmitter.

12. A method of checking a write check of tag data, the method comprising:
   transmitting, by an RFID reader, a write command to an RFID tag;
   when a response to the write command is not received within a duration of a preset threshold value, transmitting a write check command to the RFID tag;
   receiving a response including a check value of data, which needs a write check, from the RFID tag that has received the write check command; and
   checking whether data is written on the RFID tag by using the received response.

13. The method of claim 12, wherein the write check command comprises tag memory parameters to access the tag memory, which stores the data that needs the write check, wherein the tag memory parameter comprises a data storage address and a data length of the data that needs the write check.

14. The method of claim 12, wherein the data check value is a cyclic redundancy check (CRC) value of the data stored in the tag memory of the RFID tag.

15. The method of claim 12, wherein the duration of the preset threshold value is shorter than or the same as a reception duration of the response to the write command.

16. The method of claim 12, wherein the checking of whether the data has been written on the RFID tag comprises:
   comparing the data check value received from the RFID tag to a data check value that the RFID reader has, so as to check whether the data has been written on the RFID tag.

17. The method of claim 12, further comprising:
   in response to a determination that the data write has not been performed on the RFID tag after checking whether the data has been written on the RFID tag, transmitting, to the RFID tag, a command for writing the data.

* * * * *